US011904595B2

(12) United States Patent
Demange

(10) Patent No.: US 11,904,595 B2
(45) Date of Patent: Feb. 20, 2024

(54) PRINTING MACHINE OF THE BLOCKING PRESS TYPE

(71) Applicant: Illinois Tool Works Inc., Glenview, IL (US)

(72) Inventor: Florent Demange, Cholet (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 174 days.

(21) Appl. No.: 17/597,419

(22) PCT Filed: Jun. 30, 2020

(86) PCT No.: PCT/US2020/040356
§ 371 (c)(1),
(2) Date: Jan. 5, 2022

(87) PCT Pub. No.: WO2021/007078
PCT Pub. Date: Jan. 14, 2021

(65) Prior Publication Data

US 2022/0314599 A1 Oct. 6, 2022

(30) Foreign Application Priority Data

Jul. 9, 2019 (FR) ...................................... 1907698

(51) Int. Cl.
*B41F 16/00* (2006.01)
*B44C 1/14* (2006.01)
*B30B 1/14* (2006.01)

(52) U.S. Cl.
CPC ............ *B41F 16/0046* (2013.01); *B30B 1/14* (2013.01); *B41P 2219/132* (2013.01)

(58) Field of Classification Search
None
See application file for complete search history.

(56) References Cited

U.S. PATENT DOCUMENTS

| | | | | |
|---|---|---|---|---|
| 3,815,494 A | | 6/1974 | Bahnmuller | |
| 4,121,520 A | * | 10/1978 | Shenoha | B41F 19/068 101/316 |
| 5,775,216 A | | 7/1998 | Rouleau | |

FOREIGN PATENT DOCUMENTS

| | | |
|---|---|---|
| DE | 1176987 B | 8/1964 |
| DE | 1652451 B1 | 7/1971 |
| EP | 0738593 A1 | 10/1996 |
| FR | 2733179 A1 | 10/1996 |

OTHER PUBLICATIONS

International Preliminary Report on Patentability dated Jan. 20, 2022 for corresponding International Application No. PCT/US2020/040356 (7 pages).
Communication of Search Report dated Mar. 23, 2020 for corresponding French Patent Application No. 1907698 (8 pages).
International Search Report and Written Opinion dated Sep. 24, 2020 for corresponding International Application No. PCT/US2020/040356 (20 pages).

* cited by examiner

*Primary Examiner* — Leslie J Evanisko
(74) *Attorney, Agent, or Firm* — Christopher R. Carroll; The Small Patent Law Group LLC

(57) ABSTRACT

Printing machine of the blocking press type, comprising a heating block which comprises a curved carrier medium surface of a printing plate, an application head comprising means of guidance of the heating block in a tilting motion, and an actuator for tilting of the heating block relative to the application head.

10 Claims, 14 Drawing Sheets

PRINTING MACHINE OF THE BLOCKING PRESS TYPE

CROSS-REFERENCE TO RELATED APPLICATIONS

This application is a national stage entry of International Patent Application No. PCT/US2020/040356 (filed 30 Jun. 2020), which claims priority to French patent application 1907698(filed 9 Jul. 2019). The entire disclosures of which are incorporated herein by reference.

TECHNICAL FIELD OF THE INVENTION

The invention relates to a printing machine of the blocking press type, also known as heat press printing machine.

TECHNICAL BACKGROUND

The state of the art comprises, in particular, document FR-A1-2 733 179 which describes a printing machine of the blocking press type.

A machine of this type comprises

- a heating block that comprises a curved surface supporting a printing plate,
- an application head comprising means of guidance of the heating block by tilting in a plane PX, and
- an actuator for the tilting of the heating block relative to the application head.

The plate comprises a raised design corresponding to the sought-after print impression. This plate can be a solid punch for the purpose of "complete coloring" of the surface to be decorated. The plate is heated by the heating block and allows the application with a specified pressure of a carrier medium such as a sheet, a ribbon, etc. to the object to be printed. This carrier medium comprises a carrier layer and a transfer layer, with the latter being destined to be partially transferred from the carrier layer to the object to be printed depending on the design of the plate.

In the aforementioned document, the actuator is a pneumatic cylinder, the body of which is mounted on the application head and is articulated around an axis which is perpendicular to the tilting plane of the heating head (i.e. a horizontal or vertical axis). The piston of the cylinder is articulated around another horizontal or vertical axis at one end of a one-piece arm, by its end that is opposite to the heating block.

The travel of the piston brings about, on the one hand, the tilting of the heating block and, on the other hand, the pivoting of the cylinder in relation to the application head.

This machine has been very successful, and this invention proposes an improvement on said technology, which, in particular, allows for improvements as regards its bulk, its dependability, as well as of the quality of the print impression.

Since the actuator of this machine is pneumatic, the build-up of pressure in the body of the actuator creates a lag time and the exit of the piston can be sudden, which generates a non-linear force on the linkage arm to the heating block and can therefore create defects in the quality of the print impression upon start-up of the machine.

Moreover, the angle between the piston and the linkage arm varies with the tilt position of the heating block, as well as the lever arm mounted on the heating block, something that does not allow for a linear application force of the heating block during the print impression.

Lastly, the pneumatic actuator and its arrangement make this technology relatively bulky.

This invention brings a simple, efficient, and economical solution to at least a part of these problems.

SUMMARY OF THE INVENTION

According to a first aspect, the invention therefore offers a printing machine of the blocking press type, comprising:

- a heating block which comprises a curved carrier medium surface of a printing plate,
- an application head comprising means of guidance of the heating block by tilting in a plane PX, and
- an actuator for the tilting of the heating block relative to the application head, characterized in that the actuator is immovable in relation to the application head and is designed to bring about the tilting of the heating block by means of a cam, said cam being driven by the actuator and cooperating with a tracker borne by the heating block, the tracker having at least a degree of freedom in translation in relation with said cam in a plane that is parallel to the plane PX or coincident with the plane PX.

The use of a cam and of a tracker for the linking of the actuator to the heating block allows a reduction in the bulk of this linkage as well as of the actuator, which is immovable in relation to the application head and therefore does not require free space for its angular travel.

The machine according to the invention can comprise one or a plurality of the following characteristics, taken on their own or in combination one with the others:

- said curved surface is directly shaped on said block, or rather on a plate or a punch added on and fastened on the block,
- the actuator is designed to drive the cam in rotation around an axis A that is perpendicular to the plane PX,
- the actuator is designed to drive the cam in translation in a plane parallel to the plane PX or coincident with this plane PX,
- the cam has a generally elongated shape and comprises an elongation axis C which extends parallel to the plane PX,
- the cam comprises a first end fastened to an output member of the actuator and a second end comprising a receiving groove or slot, used for guidance of the tracker,
- the slot has a general U shape and the tracker is formed by a cylindrical pin,
- the application head comprises at least a pair of curved guide grooves for guide runners borne by the heating block, with the tracker being arranged in a plane P1 that is perpendicular to the plane PX and passing between the guide runners and substantially in the middle of the curved surface,
- the actuator is arranged on top of the application head and of the heating block,
- the actuator comprises an electric motor and optionally a reducer; the use of an electric motor allows for a servo-assist of the actuator, which is advantageous to ensure a linear tilting force for the heating block.

According to a second aspect, the invention thus proposes a printing machine of the blocking press type, comprising:

- a heating block which comprises a curved carrier medium surface of a printing plate,
- an application head comprising means of guidance of the heating block by tilting in a plane PX, and an actuator for the tilting of the heating block relative to the application head, said actuator being linked by a linkage member to the heating block, characterized in that the actuator is mounted movably in translation in relation to the application head in a plane that is parallel to the plane PX or coincident with the plane PX.

The travels of the heating block and of the actuator therefore take place in parallel or coincident planes, which allows for the optimization of the compactness of the machine.

The machine according to the invention can comprise one or a plurality of the following characteristics, taken on their own from one another or in combination one with the others:

- the actuator is mounted movably in vertical or horizontal translation in relation to the application head,
- the actuator is linked to sliders mounted movably in translation on rails borne by a plate that is immovable in relation to the application head,
- the linkage member is a connecting rod and the actuator is designed to drive said connecting rod in rotation around an axis A that is perpendicular to the plane PX,
- the actuator is designed to drive the linkage member in translation in a plane that is parallel to the plane PX or coincident with this plane PX,
- the linkage member has a generally elongated shape and comprises an elongation axis C which extends parallel to the plane PX,
- the linkage member comprises a first end fastened to an output member of the actuator and a second end comprising a receiving hole, used for guidance in rotation of a cylindrical pin borne by the heating block,
- the application head comprises at least a pair of curved guide grooves for guide runners borne by the heating block, the pin being arranged in a plane P1 that is perpendicular to the plane PX and passing between the guide runners and substantially in the middle of the curved surface,
- the actuator is arranged on top of the application head and of the heating block,
- the actuator comprises a linear electric motor or a cylinder, and optionally a reducer; the use of an electric motor allows for a servo-assist of the actuator, which is advantageous to ensure a linear tilting force for the heating block.

BRIEF DESCRIPTION OF THE FIGURES

The invention will be better understood, and other details, characteristics and advantages of this invention will more clearly appear upon reading the description that follows, given by way of non-limiting example and in reference to the attached drawings, in which.

DETAILED DESCRIPTION OF THE INVENTION

FIGS. 1 to 5 represent a first embodiment of a printing machine 10 of the blocking press type.

Figure 2:
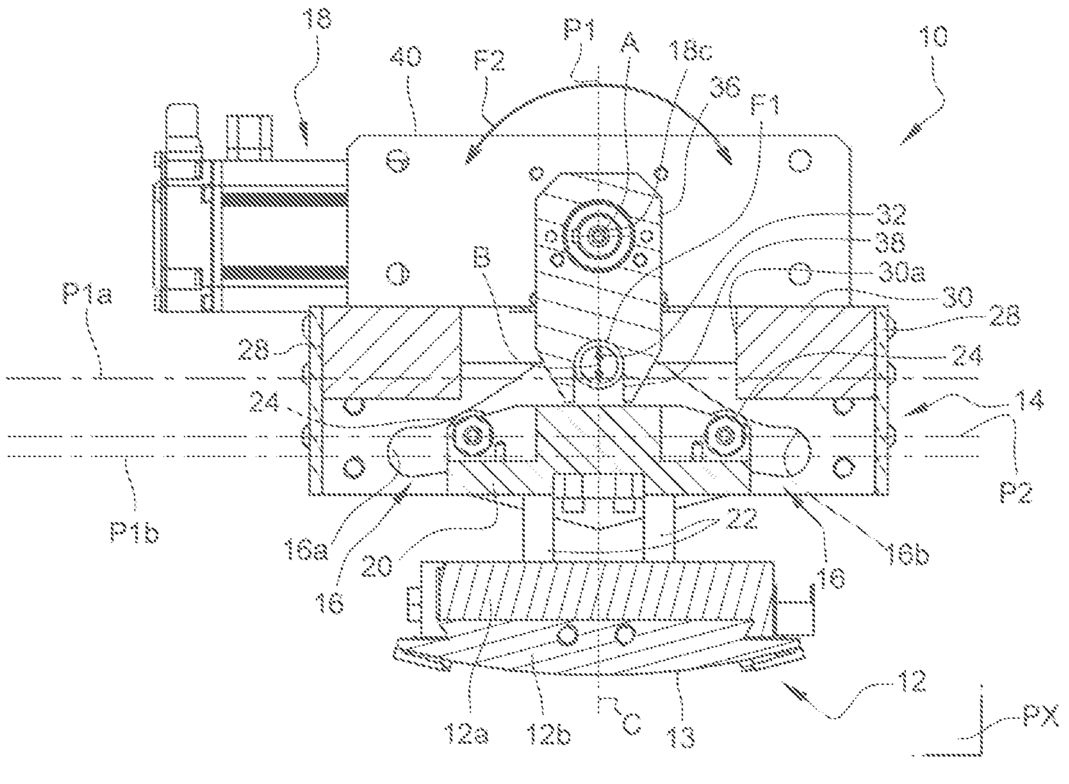
FIG. 2 is a schematic view, in cross-section, of the machine of FIG. 1.
Figure 3:
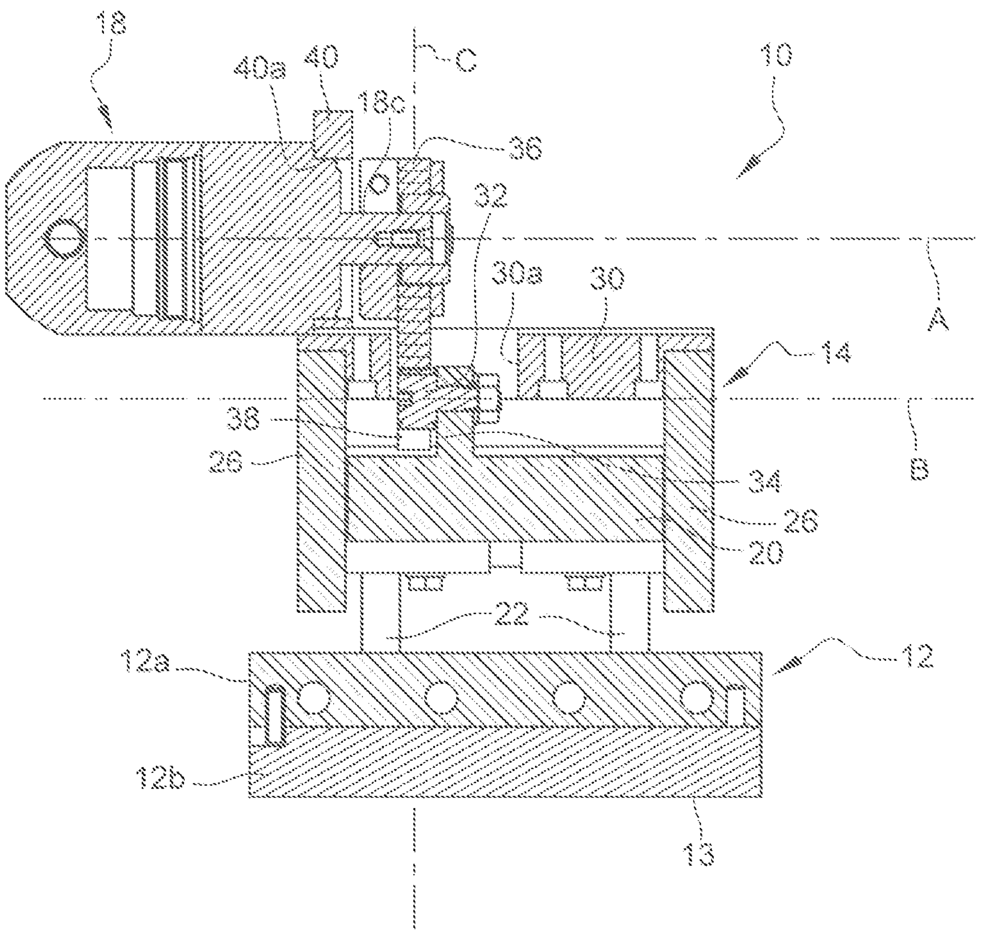
FIG. 3 is another schematic view, in cross-section, of the machine of FIG. 1.
Figure 4:
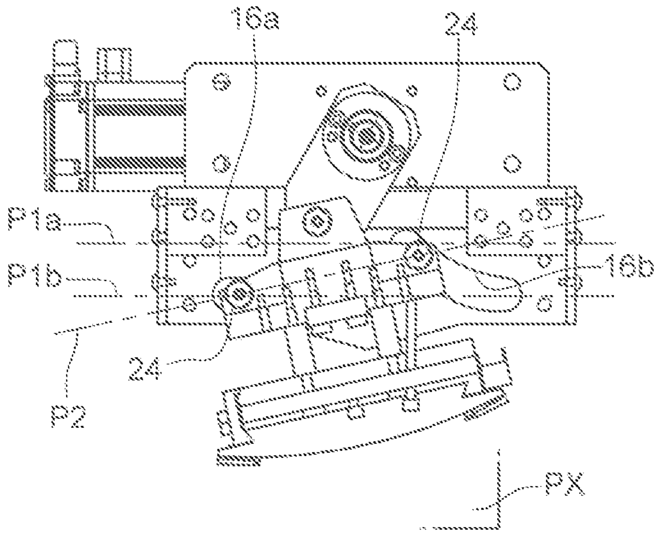
FIG. 4 is a view similar to that of FIG. 2 and illustrating a tilting position of a heating block of the machine.
Figure 5:
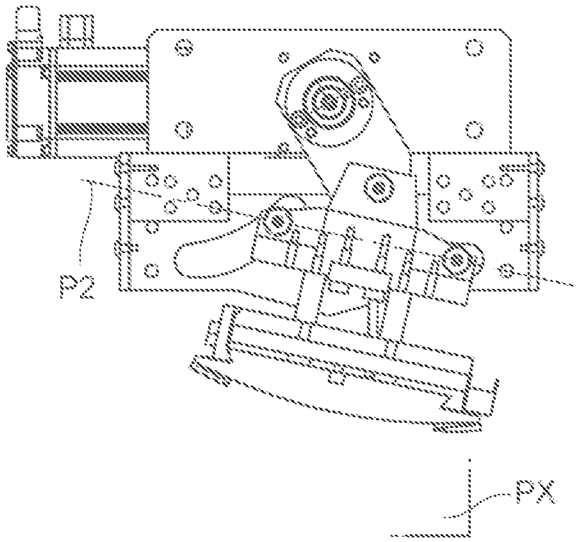
FIG. 5 is a view similar to that of FIG. 2 and illustrating another tilting position of a heating block of the machine.

The machine 10 substantially comprises three elements, namely:

- a heating block 12 which comprises a curved carrier medium surface 13 of a printing plate (not shown),
- an application head 14 comprising means of guidance 16 of the heating block 12 by tilting in a plane PX, which is coincident with the plane of the sheet or the plane the cross-sections of FIGS. 2, 4 and 5, and
- an actuator 18 for the tilting of the heating block 12 relative to the application head 14.

The heating block 12 is similar to that described in document FR-A1-2 733 179. It comprises two superimposed parts, the upper part 12*a* of which is equipped with heating means, such as resistances or heating fluid piping, and a lower part 12*b* hooked, here by a dovetail system, to the upper part 12*a* and comprising the curved surface 13 at its lower end.

The heating block 12 moreover comprises an upper platen 20 which is solidly linked to the upper part 12*b* by cross beams 22.

The platen 20 bears guide runners 24 intended to cooperate with means of guidance 16 borne by the application head 14. The platen 20 can comprise at least a pair of guide runners 24 and ideally two pairs of guide runners, with the pair or each pair of guide runners intended to cooperate with a pair of grooves 16*a*, 16*b* forming the means of guidance 16.

The guide runners 24 are arranged in a plane P2 perpendicular to the plane PX and are each oriented in a direction perpendicular to the plane PX. FIGS. 2, 4 and 5 allow the visualization of a pair of guide runners 24 and the associated grooves 16*a*, 16*b*.

The grooves 16*a*, 16*b* are curved and each has a general kidney shape in the depicted example. They are arranged in a symmetrical manner in relation to a median plane P1, perpendicular to the plane PX, which here has a vertical plane. The grooves 16*a*, 16*b* are arranged in such a manner that their closest ends are arranged in a foreground P1*a*, perpendicular to the plane PX, and here horizontal, and that their most distant ends are arranged in a second plane P1*b*, perpendicular to the plane PX, and here also horizontal. The plane P1*a* is arranged on top of the plane P1*b* which is arranged on top of the parts 12*a*, 12*b* of the heating block 12.

Guide runners 24 are separated one from the others by a distance that allows them to cooperate by rolling into the grooves 16*a*, 16*b* and to thus guide by tilting the heating block 12 relative to the application head 14.

FIGS. 4 and 5 demonstrate the extreme tilting positions of the heating block 12. In FIG. 4, a first of the guide runners is in plane P1*a* and the other of the guide runners is in the plane P1*b*. The platen 20 is therefore inclined, and the heating block tilted. In FIG. 5, the first of the guide runners is in plane P1*b* and the other of the guide runners in in plane P1*a*. The platen 20 is therefore inclined towards the other side and the heating block tilted towards the other side. FIG. 2 illustrates a median position of the heating block 12 in which the plane P2 of the guide runners is parallel to the planes P1*a*, P1*b* and located between said planes (and is therefore horizontal).

Figure 1:
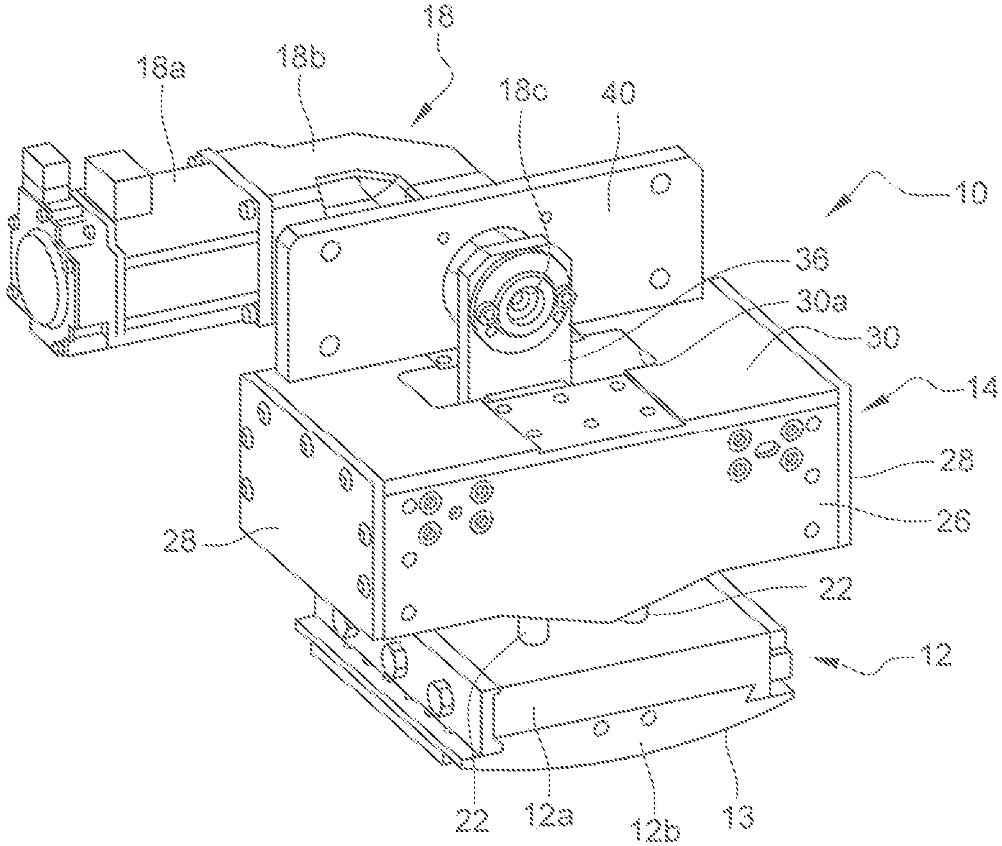
FIG. 1 is a schematic view, in perspective, of a printing machine of the blocking press type according to a first embodiment.

The grooves 16*a*, 16*b* can be shaped in a flange 26 of the application head 14. In the case in which the application head 14 comprises two pairs of grooves 16*a*, 16*b*, the two pairs could be formed respectively in parallel flanges 26 of the application head 14. In the example depicted, the application head 14 has a generally parallelepiped box shape in which is housed the platen 20 and the two sides of which are formed by the flanges 26, which can respectively be designated as fore and aft flanges. These flanges 26 are linked to one another by two lateral walls 28 and by one upper wall 30 (FIG. 1). The lower end of the box and therefore of the application head 14 is open to enable travel of the platen 20 and of the cross beams 22.

The heating block 12 moreover comprises a tracker 32. This tracker 32 is here fastened to an upper connector flange 34 of the platen 20. The connector flange 34 extends in the plane PX, on top of the plane P2. The tracker 32 is therefore immovable in relation to the heating block 12.

In the example depicted, the tracker 32 is shown in the form of a cylindrical pin which defines an axis B, perpendicular to the plane PX.

The actuator 18 here comprises an electric motor 18*a* associated with a mechanical reducer 18*b*, or rather a bell crank to limit the bulk of the machine 10. The actuator 18 is here located on top of the application head 14 and of the heating block 12.

The actuator 18 is here immovable in relation to the application head 14 and is designed to bring about the tilting of the heating block 12 by means of a cam 36, said cam being driven in rotation by the actuator and cooperating with the tracker 32 borne by the heating block 12.

In the example depicted, the cam 36 has a generally elongated shape and comprises a longitudinal end, here an upper end, which is fastened to an output member 18*c* of the actuator 18, and an opposite longitudinal end, here a lower end, which comprises a receiving groove or slot 38 used for guidance of the tracker 32. The cam 36 is, for example, formed by a simple plate which extends in a plane that is parallel to the plane PX or coincident with this plane PX.

The output member 18*c* has a rotation axis A which is the rotation axis of the cam.

The slot 38 here has a general U shape, the groove of which is oriented towards below in the case of this horizontal assembly (in the case of a variant where the assembly would be vertical, the groove of this slot would then be oriented towards the side). The tracker 32 is lodged in slot 36 and has a diameter that is slightly inferior to the thickness of the slot, to cooperate by rotation with its peripheral edges. The tracker 32 is suitable for sliding in the slot 38 and has at least a degree of freedom in translation (arrow F1) in the slot 38, in a plane that is parallel to the plane PX or coincident with this plane PX.

The cam 36 traverses a hole 30*a* of the upper wall 30 of the application head 14. Said application head comprises a vertical rear wall 40 upon which is fastened the actuator 18 and which comprises a through hole 40*a* of its output member 18*c*.

The actuation of the actuator 18 brings about rotation of its output member 18*c*, which brings about a rotation of the cam 36 around the axis A (arrow F2). The cam 36, in turn, will force the travel of the tracker 32 and therefore the tilting of the heating block 12 in the plane PX. The tracker 32 is free to travel in translation in the slot 38 of the cam 36 to enable the travels of the guide runners 24 between the planes P1*a* and P1*b*.

Figure 6:
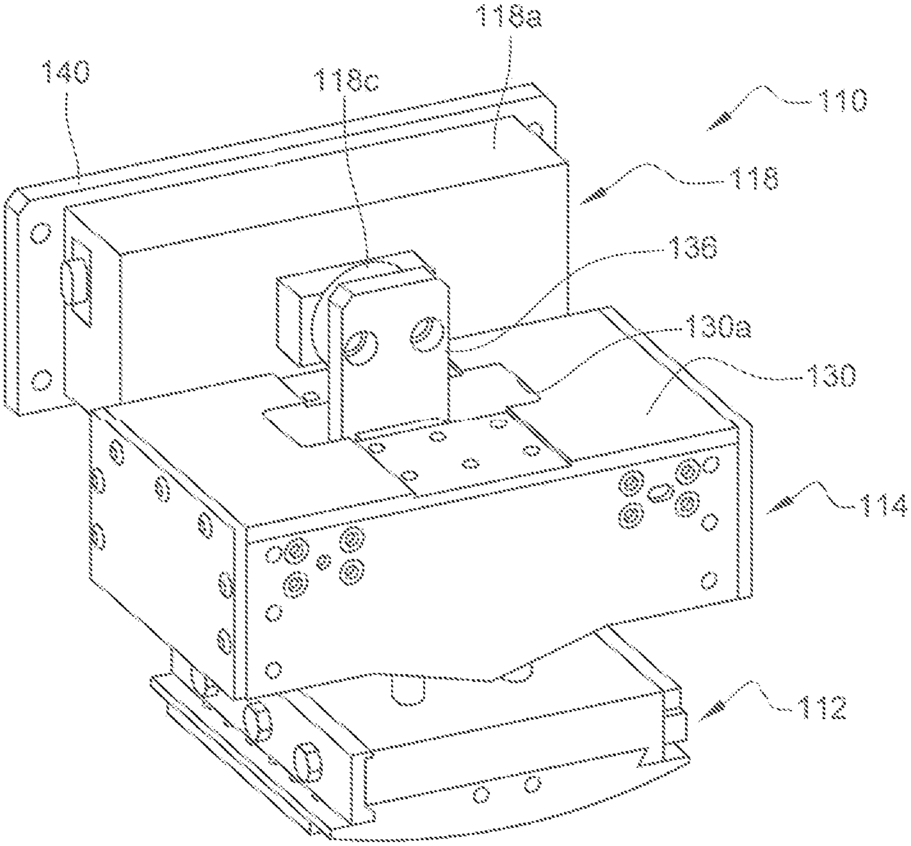
FIG. 6 is a schematic view, in perspective, of a printing machine of the blocking press type according to a second embodiment.
Figure 7:
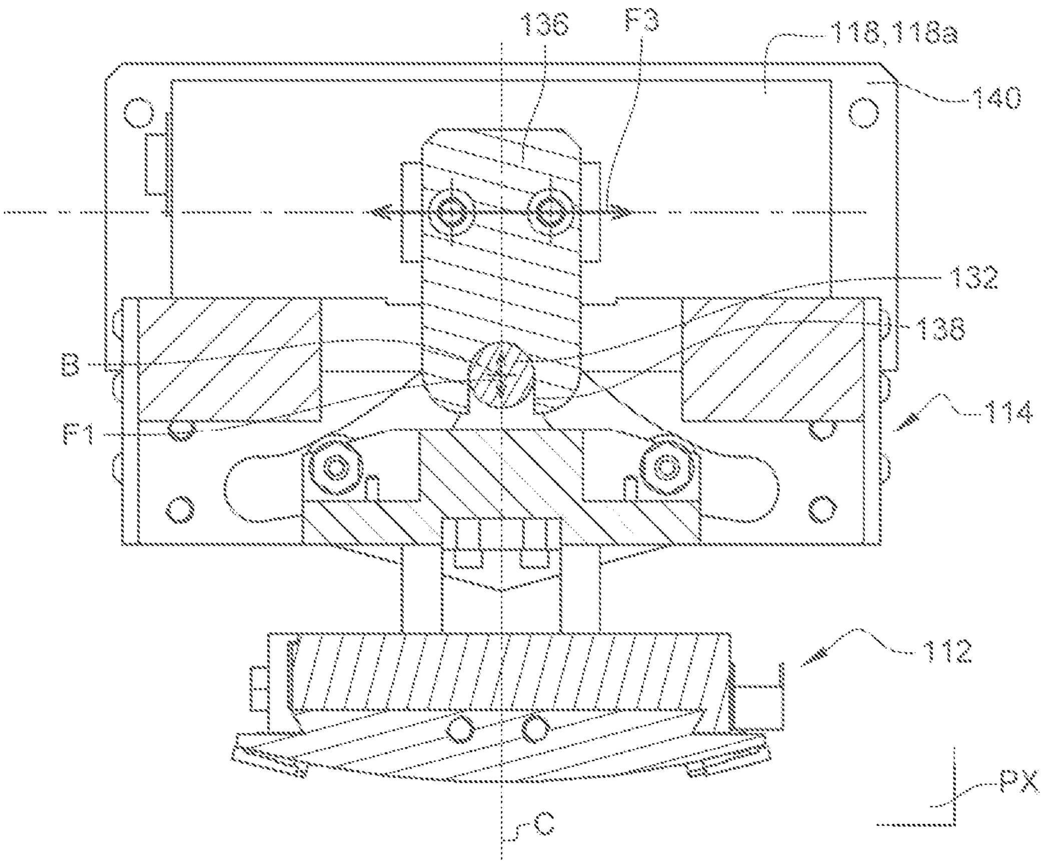
FIG. 7 is a schematic view, in cross-section, of the machine of FIG. 6.
Figure 8:
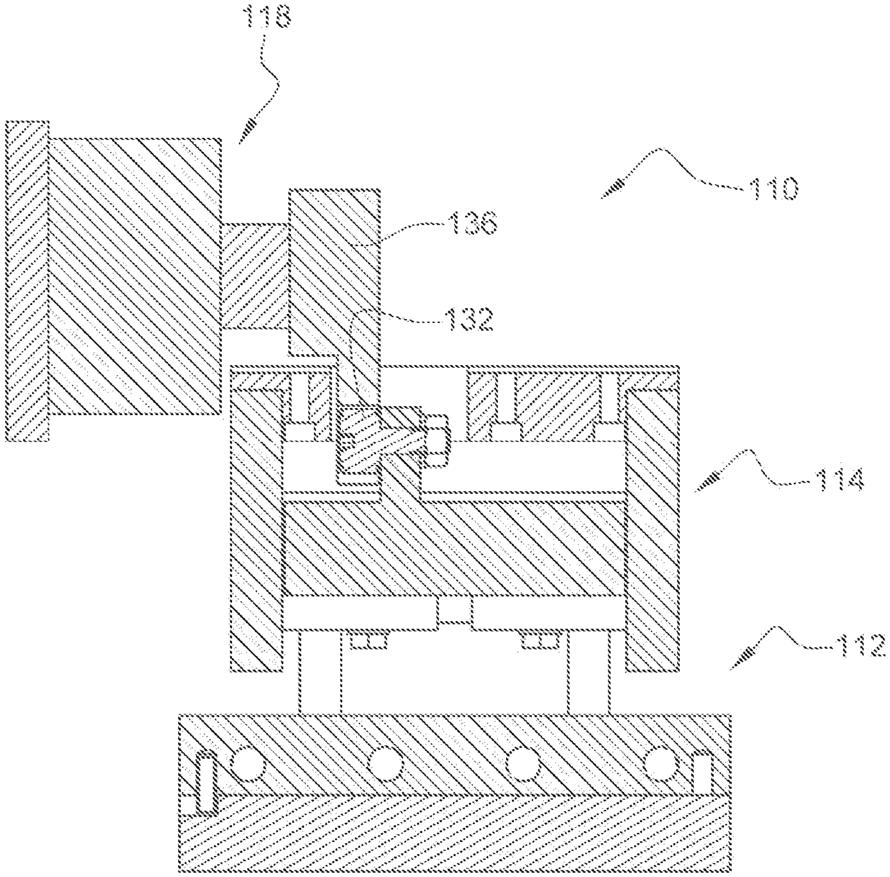
FIG. 8 is a schematic view, in cross-section, of the machine of FIG. 6.

FIGS. 6 to 8 depict a second embodiment of a printing machine 110 of the blocking press type.

The machine 110 differs from the machine 10, described here above, mainly in the actuator 118 and cam 136.

The actuator 118 here comprises a linear electric motor 118*a* located on top of the application head 114 and of the heating block 112. The actuator 118 is immovable in relation to the application head 114 and is designed to bring about the tilting of the heating block 112 by means of the cam 136, said cam 136 being driven in translation by the actuator and cooperating with the tracker 32 borne by the heating block 112. The motor 118*a* of the actuator 118 is therefore a linear travel motor and not a rotating motor (arrow F3).

The cam 136 has a generally elongated shape and comprises a longitudinal end, here an upper end, which is fastened to the output member 118*c* of the actuator 118, and an opposite longitudinal end, here a lower end, which comprises a receiving groove or slot 138 used for guidance of the tracker 132. The cam 136 is, for example, formed by a simple plate which extends in a plane parallel to the plane PX or coincident with this plane PX.

The slot 138 is similar to the slot 38 and cooperates with the tracker 132 as described here above in relation to the first embodiment.

The cam 136 traverses a hole 130*a* of the upper wall 130 of the application head 114. The actuator 118 is fastened to a vertical rear wall 140 which can be realized as one piece with the application head 114.

Actuation of the actuator 118 brings about translation of its output member 118*c*, which will bring about a translation of the cam 136 (arrow F3) in a plane that is parallel to the plane PX or coincident with this plane PX. The cam 136 will, in turn, force travel of the tracker 132 and therefore the tilting of heating block 112. The tracker 132 is free to travel in translation in the slot 138 of the member 136 to enable travels of the guide runners 124 in the grooves of the application head 114.

Figure 9:
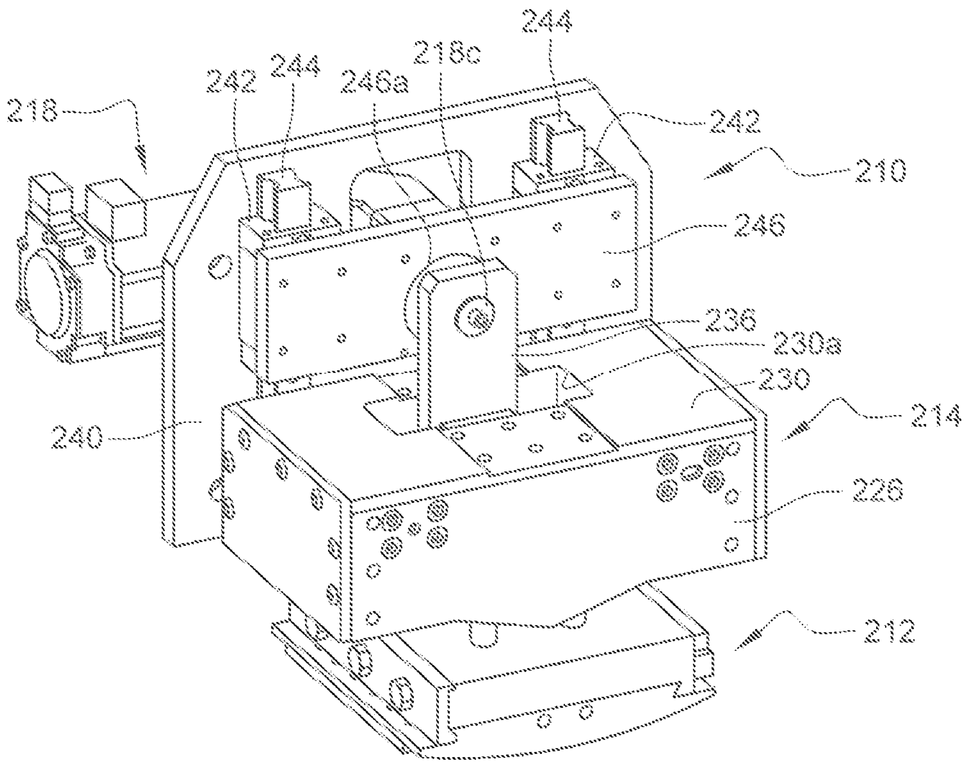
FIG. 9 is a schematic view, in perspective, of a printing machine of the blocking press type according to a third embodiment.
Figure 10:
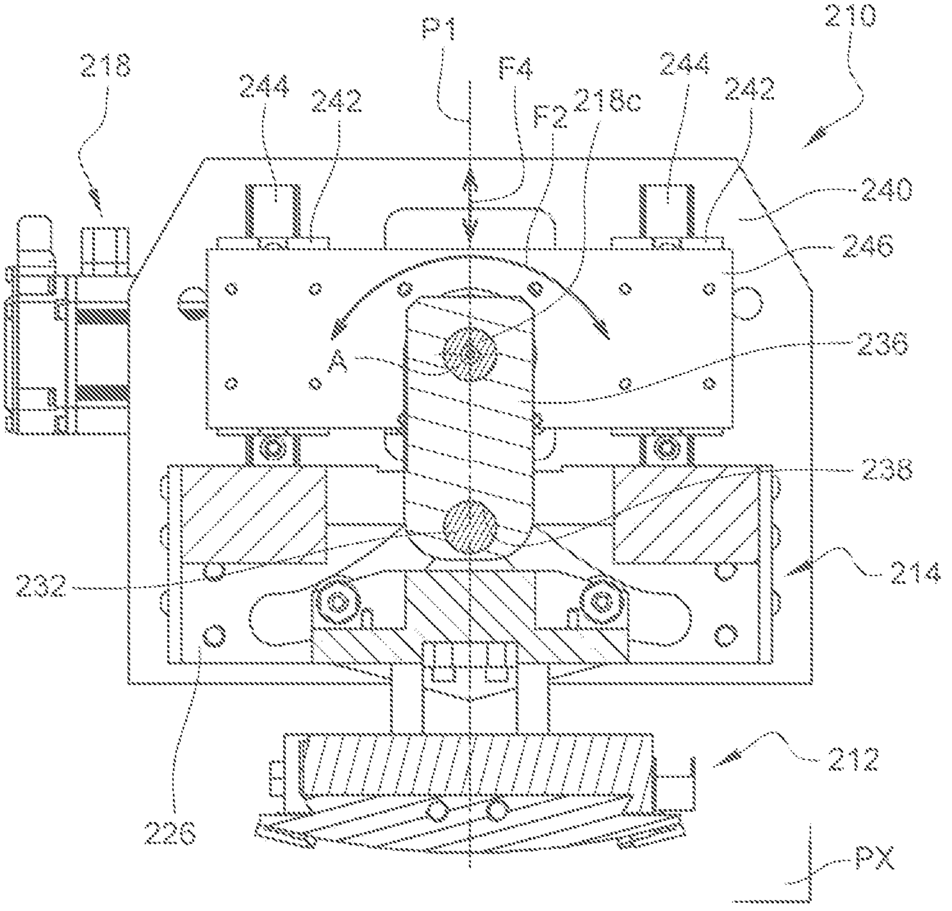
FIG. 10 is a schematic view, in cross-section, of the machine of FIG. 9.
Figure 11:
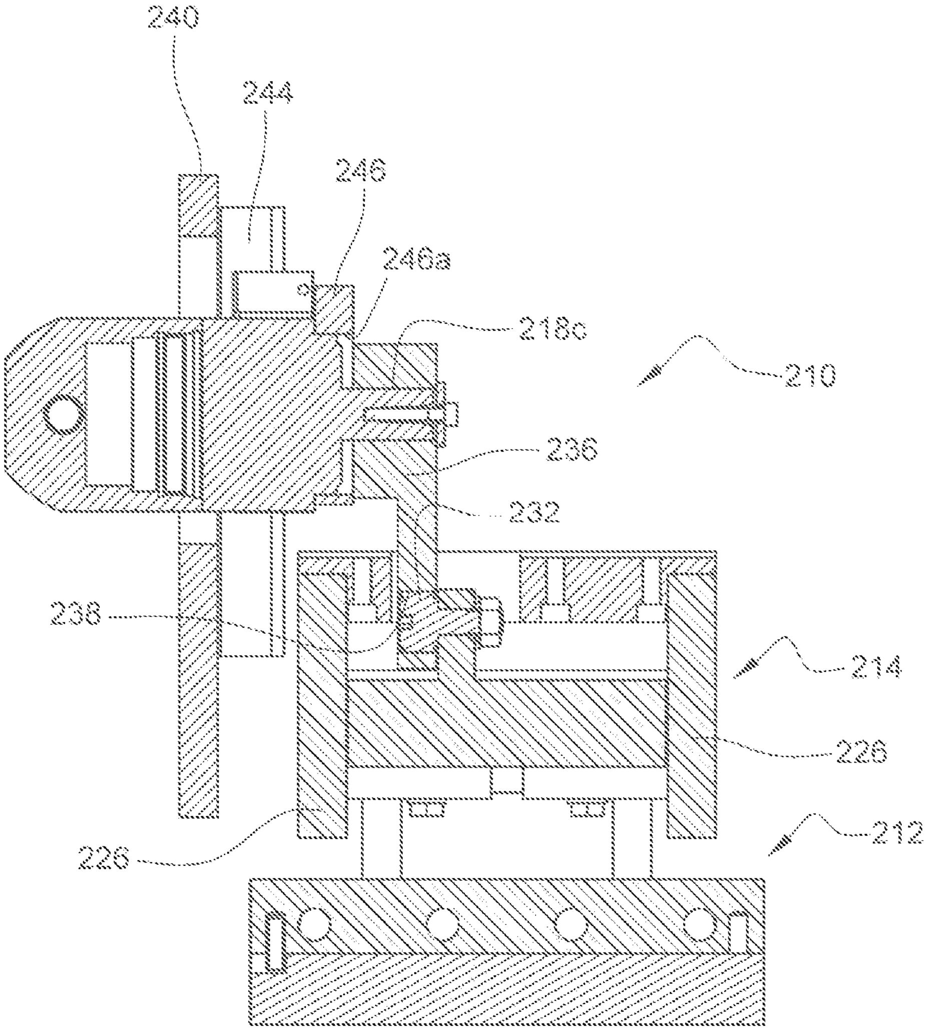
FIG. 11 is a schematic view, in cross-section, of the machine of FIG. 9.

FIGS. 9 to 11 illustrate a third embodiment of a printing machine 210 of the blocking press type.

Said machine 210 differs from the machine 10 described here above, mainly in the assembly of the actuator 218, as well as by the member 236 linking the output member 218*c* of the actuator to the heating block 212.

The actuator 218 is similar to the actuator 18. It is however here mounted movably in translation in relation to the application head 214, in a plane that is parallel to the plane PX or coincident with this plane PX. This plane is here vertical.

In the embodiment example depicted, this assembly in translation is achieved using a system with rails and sliders. The actuator 218 is linked to specific sliders 242 mounted movably in translation on rails 244.

The rails 244 are two in number and are vertical in the framework of horizontal assembly (they would be horizontal in the case of a vertical assembly) and arranged on each side of the aforementioned plane P1. They are here borne by a vertical rear plate 240 in the framework of horizontal assembly (it would be horizontal in the case of a vertical assembly) which can be realized as a part of or as a one-piece assembly with the application head 214. The plate 240 is here fastened to the rear flange 226 of the application head 214. The rails 244 extend towards the top in the framework of horizontal assembly (they would extend towards the side in the case of vertical assembly), starting from the application head 214, and each receive specific sliders 242, which in turn are themselves fastened to another plate 246 fastened to the actuator 218 and comprising a through hole 246*a* and a rotation hole of the output member 218*c* of the actuator 218.

The linkage member 236 has a generally elongated shape and comprises a longitudinal end, here an upper end, which is fastened to the output member 218*c* of the actuator 218, and an opposite longitudinal end, here a lower end, which comprises a receiving groove or slot 238 used for guidance in rotation of a cylindrical pin 232 borne by the heating block 212. The member 236 is, for example, formed by a simple plate which extends in a plane that is parallel to the plane PX or coincident with this plane PX. The member 236 here forms a connecting rod.

The member 236 traverses a hole 230*a* of the upper wall 230 of the application head 214.

The actuation of the actuator 218 brings about the rotation of its output member 218*c*, which will drive a rotation of the member 236 around the axis A (arrow F2). In turn, the member 236 will force the travel of the pin 232 and therefore the tilting of the heating block 212. The pivoting of the member 236 around the axis A will bring about the travel in translation of the actuator 218 relative to the application head 214.

Figure 12:
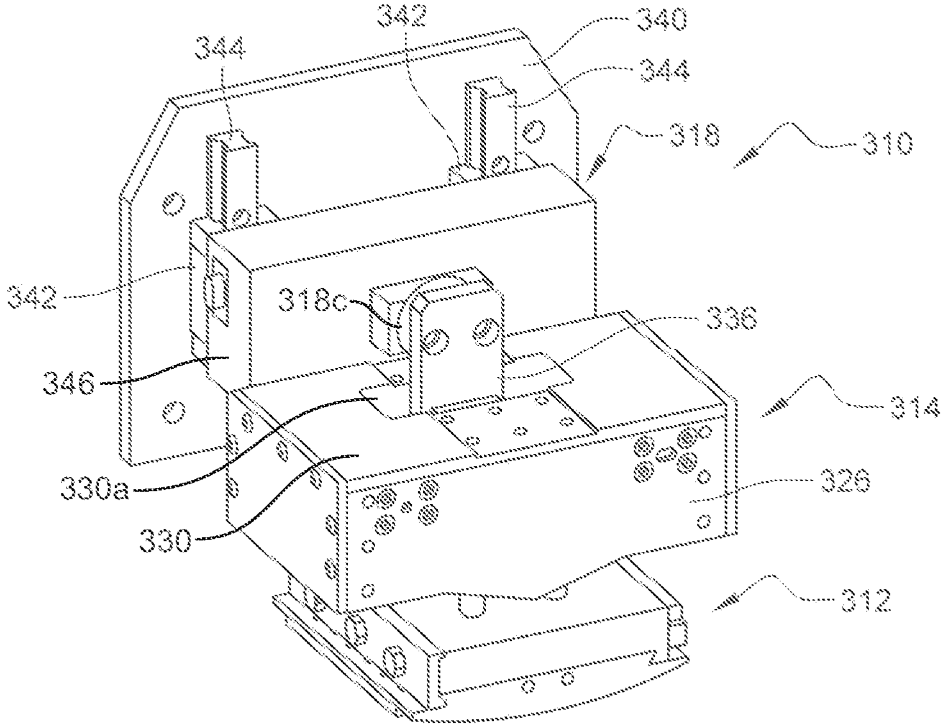
FIG. 12 is a schematic view, in perspective, of a printing machine of the blocking press type according to a fourth embodiment.
Figure 13:
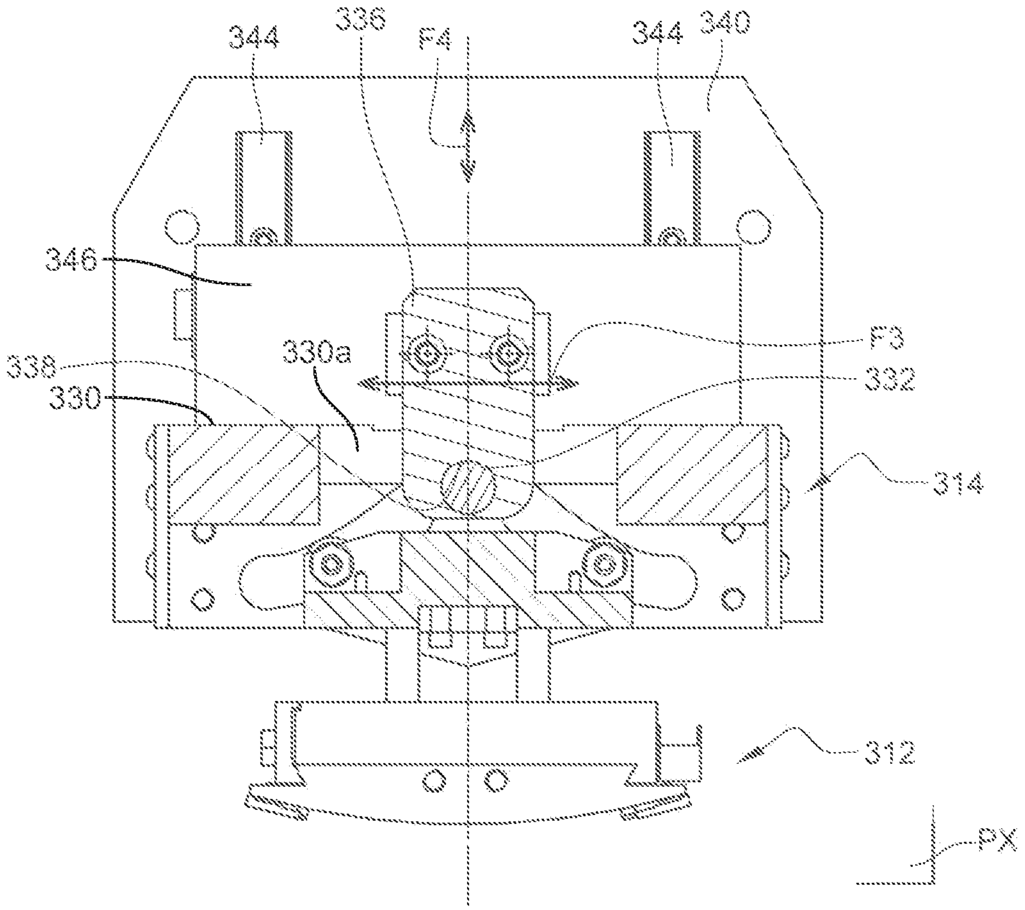
FIG. 13 is a schematic view, in cross-section, of the machine of FIG. 12.
Figure 14:
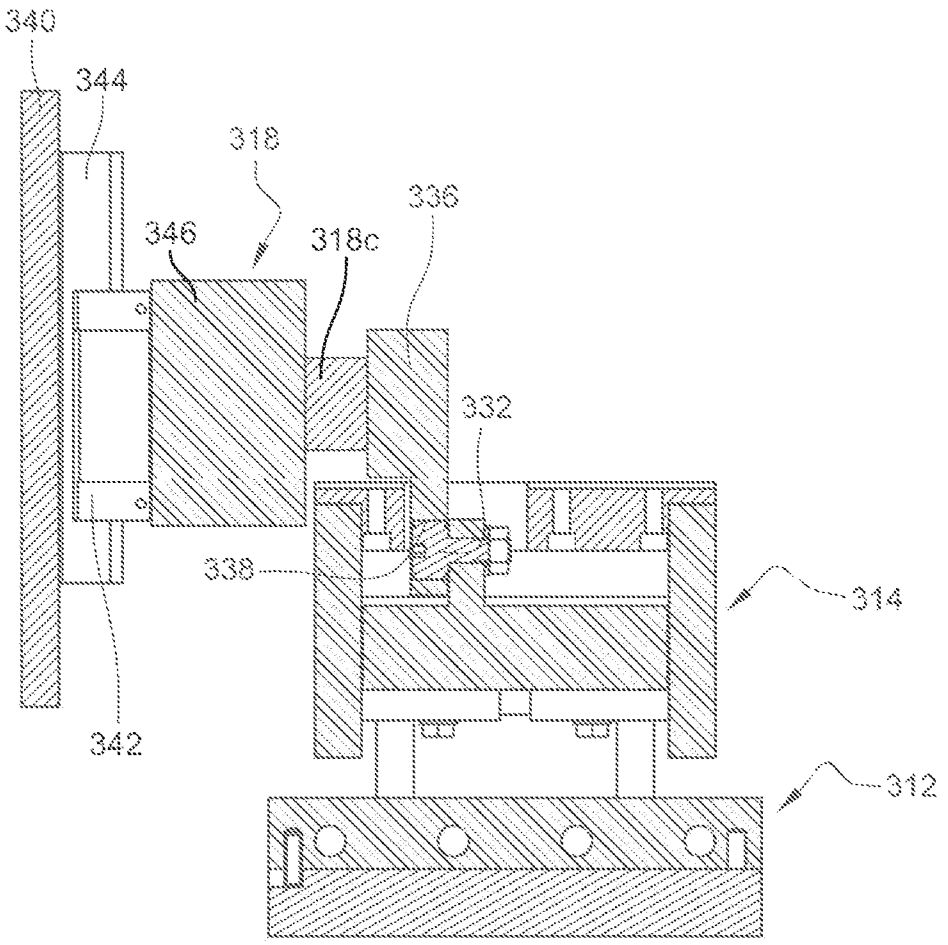
FIG. 14 is a schematic view, in cross-section, of the machine of FIG. 12.

FIGS. 12 to 14 illustrate a fourth embodiment of a printing machine 310 of the blocking press type.

The machine 310 differs from the machine 110 described here above, mainly by the assembly of the actuator 318, as well as by the member 336 linking the output member 318*c* of the actuator to the heating block 312.

The actuator 318 is similar to the actuator 118. It is nonetheless here mounted movably in translation, in relation to the application head 314, in a plane parallel to the plane PX or coincident with this plane PX. This plane is here vertical.

In the embodiment example depicted, this assembly in translation is achieved by a system of rails and sliders. The actuator 318 is linked to specific sliders 342 mounted movably in translation on specific rails 344.

The rails 344 are two in number and are vertical and arranged on each side of the aforementioned plane P1. They are here borne by a vertical rear plate 340 which can be realized as a part of or as a one-piece assembly with the application head 314. The plate 340 is here fastened to the rear flange 326 of the application head 314. The rails 344 extend towards the top starting from application head 314 and each receive specific sliders 342 which are themselves fastened to another plate 346 fastened to the actuator 318 and comprising a through hole 346*a* and a rotation hole of the output member 318*c* of the actuator 318.

The rails 344 are two in number and are vertical and arranged on each side of the aforementioned plane P1. They are here borne by a vertical rear plate 340 which can be realized as a part of or as a one-piece assembly with the application head 314. The plate 340 is here fastened to the rear flange 326 of the application head 314. The rails 344 extend towards the top starting from application head 314 and each receive specific sliders 342 which are themselves fastened to another plate 346 fastened to the actuator 318 and comprising a through hole and a rotation hole of the output member 318*c* of the actuator 318.

The linkage member 336 has a generally elongated shape and comprises a longitudinal end, here an upper end, which is fastened to the output member 318*c* of the actuator 318, and an opposite longitudinal end, here a lower end, which comprises a receiving groove or slot 338 used for guidance in rotation of the cylindrical pin 332, borne by the heating block 312. The member 336 is, for example, formed by a simple plate which extends in a plane that is parallel to the plane PX or coincident with this plane PX.

The member 336 traverses a hole 330*a* of the upper wall 330 of the application head 314.

The actuation of the actuator 318 brings about the translation of its output member 318*c*, which will bring about a translation of the member 336 (arrow F3) in a plane that is parallel to the plane PX or coincident with this plane PX. The member 336 will, in turn, force travel of the pin 332 and therefore the tilting of the heating block 312, which will bring about travel in translation of the actuator 318 (arrow F4) relative to the application head 314.

The invention claimed is:

1. A blocking press type printing machine comprising:

a heating block having a curved carrier medium surface of a printing plate, an application head having guidance means of the heating block by tilting in a plane PX; and an actuator configured to tilt the heating block relative to the application head, wherein the actuator is immovable in relation to the application head and is configured to tilt the heating block by a cam that is driven by the actuator and cooperating with a tracker borne by the heating block, the tracker having at least a degree of freedom in translation relative to the cam in a second plane that is parallel to the plane PX or coincident with the plane PX.

2. The blocking press type printing machine according to claim 1, wherein the actuator configured to drive the cam in rotation around an axis A that is perpendicular to the plane PX.

3. The blocking press type printing machine according to claim 1, wherein the actuator configured to drive the cam in translation in a plane that is parallel to the plane PX or coincident with the plane PX.

4. The blocking press type printing machine according to claim 3, wherein the cam has an elongated shape and comprises an elongation axis C which extends parallel to the plane PX.

5. The blocking press type printing machine according to claim 1, to wherein the cam comprises a first end fastened to an output member of the actuator and a second end comprising a receiving groove or a slot used for guidance of the tracker.

6. The blocking press type printing machine according to claim 5, wherein the slot has a U shape and the tracker is formed by a cylindrical pin.

7. The blocking press type printing machine according to claim 1, wherein the application head comprises at least one pair of curved guidance grooves of guide runners borne by the heating block, the tracker arranged in a plane P1 that is perpendicular to the plane PX and passing between the guide runners and in the middle of the curved surface.

8. The blocking press type printing machine according to claim 1, wherein the actuator is arranged on top of the application head and of the heating block.

9. The blocking press type printing machine according to claim 1, wherein the actuator comprises a linear electric motor or a cylinder.

10. The blocking press type printing machine according to claim 9, wherein the actuator also comprises a reducer.

* * * * *